United States Patent [19]

Schwetje et al.

[11] Patent Number: 4,935,393
[45] Date of Patent: Jun. 19, 1990

[54] PROCESS FOR CATALYTIC REDUCTION OF NITROGEN OXIDES

[75] Inventors: Norbert Schwetje, Hanover; Dieter Kipping, Burgwedel, both of Fed. Rep. of Germany

[73] Assignee: Kali-Chemie AG, Hannover, Fed. Rep. of Germany

[21] Appl. No.: 104,064

[22] Filed: Oct. 5, 1987

[30] Foreign Application Priority Data

Oct. 8, 1986 [DE] Fed. Rep. of Germany ....... 3634243

[51] Int. Cl.$^5$ ............................................. B01J 29/08
[52] U.S. Cl. ...................................... 502/65; 502/64; 502/79
[58] Field of Search ........................... 502/65, 79, 64; 423/239, 239 A

[56] References Cited

U.S. PATENT DOCUMENTS

| | | | |
|---|---|---|---|
| 3,013,986 | 12/1961 | Castor | 502/79 |
| 3,210,267 | 10/1965 | Plank et al. | 502/65 |
| 4,052,337 | 10/1977 | Nishikawa et al. | 423/239 A |
| 4,104,361 | 8/1978 | Nishikawa et al. | 423/239 |
| 4,258,020 | 3/1981 | Ginger | 423/239 A |
| 4,564,604 | 1/1986 | Iida et al. | 423/239 |

FOREIGN PATENT DOCUMENTS

| | | |
|---|---|---|
| 0081774 | 6/1983 | European Pat. Off. . |
| 0169939 | 2/1986 | European Pat. Off. . |
| 2500326 | 8/1982 | France . |
| 1417546 | 12/1975 | United Kingdom . |

*Primary Examiner*—Carl F. Dees
*Attorney, Agent, or Firm*—Foley & Lardner, Schwartz, Jeffery, Schwaab, Mack, Blumenthal & Evans

[57] ABSTRACT

A process for catalytically reducing nitrogen oxides in an exhaust gas such as a combustion gas and a catalyst suitable for use therein. The catalyst comprises a zeolite Y which has been ion exchanged with lithium ions and/or rare earth metal ions, and may be dispersed in an amorphous oxide gel matrix.

3 Claims, No Drawings

PROCESS FOR CATALYTIC REDUCTION OF NITROGEN OXIDES

BACKGROUND OF THE INVENTION

The present invention relates to a process for catalytic reduction of nitrogen oxides as well as to a catalyst particularly suitable for such a process.

For selective catalytic reduction of nitrogen oxides ($NO_x$) in exhaust gases it has already been suggested to utilize zeolites as catalysts. The previously suggested solutions, however, operate at relatively high temperatures. Thus, when zeolite A or X in the sodium or hydrogen form (H-form) is utilized, even with stoichiometric addition of ammonia as a reducing agent, at 320° C. only about 70% of the nitrogen oxides are converted.

SUMMARY OF THE INVENTION

It is the object of the present invention to improve the existing processes for catalytic reduction of nitrogen oxides in exhaust gases and, in particular, to make available a process which permits operation at lower temperature.

A further object of the invention is to make available a new catalyst which is particularly suitable for use in the process according to the invention.

These and other objects of the invention are accomplished by providing a process for catalytic reduction of nitrogen oxides ($NO_x$) in exhaust gases comprising treating the exhaust gas in the presence of a hydrogen donor with a catalyst comprising a zeolite Y which has been subjected to ion exchange with at least one ion selected from the group consisting of lithium ion and rare earth metal ions.

According to a further aspect of the invention the objects are also achieved by providing a catalyst suitable for selective reduction of nitrogen oxides ($NO_x$) in exhaust gases comprising:

(a) 10 to 95% by weight zeolite Y which has been subjected to ion exchange with at least one ion selected from the group consisting of lithium ion and rare earth metal ions;

(b) 4.95 to 89.95% by weight amorphous oxide gel matrix formed of at least one oxide selected from the group consisting of $SiO_2$ and oxides of the metals aluminum, magnesium, calcium, titanium and zirconium or binary or ternary mixtures of such oxides; and (c) 0.05 to 15% by weight of a phase having hydrogen binding capability selected from the group consisting of transition metals and compounds of transition metals, in which the sum of the components (a) through (c) amounts in each case to 100%.

DETAILED DESCRIPTION OF PREFERRED EMBODIMENTS

The process according to the invention starts from a process of the foregoing type for catalytic reduction of nitrogen oxides ($NO_x$) in exhaust gases, particularly combustion gases, by treatment of the exhaust gas with a zeolite-based catalyst with the addition of hydrogen donor, and is characterized in that a catalyst is utilized which contains lithium and/or rare earth metal ion exchanged zeolite Y.

The term "rare earth ions" is understood to refer to ions of the elements having the atomic numbers 57 to 71. Preferred rare earth ions include ions of the elements cerium, lanthanum, praseodymium, neodymium and samarium.

In accordance with the invention it is preferred that zeolite Y be utilized in which 10 to 100 mole-%, preferably 40 to 90 mole-%, of the exchangeable ions are replaced by lithium and/or rare earth ions.

The production of such exchanged zeolite is itself known. It can, on the one hand, take place hydrothermally through crystallization of zeolite Y in the presence of rare earth and/or lithium ions. However, production through cation exchange by treatment of crystalline zeolite Y with a solution of a salt of lithium, rare earth and/or their mixtures is preferred. Such a manner of operation is described in general fashion in German examined application DE-AS No. 1 299 603—which describes the production of catalysts which are suitable for conversion of hydrocarbons—particularly in column 3, line 15 through column 4, line 26 as well as Example 1, and can be adapted analogously for the production of exchanged zeolite Y.

In one embodiment of the invention the catalyst can be utilized as such, for example in the form of pellets, binder containing formed bodies or on conventional supports.

In a preferred variant of the invention the exchanged, crystalline zeolite Y is utilized dispersed in an amorphous matrix of oxide gel. The term "dispersed" is used thereby in the sense of finely distributed. Good results are obtained if the proportion of exchanged zeolite Y amounts to at least 10% by weight and of oxide gel to a maximum of 90% by weight with reference to the mixture. The proportion of exchanged zeolite Y can thereby vary throughout the entire range up to 100% by weight with simultaneously decreasing proportions of oxide gel down to 0% by weight.

In one preferred variant the invention contemplates utilizing a mixture of 15 to 40% by weight zeolite Y and 85 to 60% by weight as the catalyst.

Possible matrices for the exchanged zeolite Y include oxide gels or mixed gels from the group $SiO_2$ and/or oxides of metals from groups II, IIIB, IVA, and VIA of the periodic table of elements.

Preferably, the oxide gel is selected from the group $SiO_2$ and/or the oxides of the metals aluminum, magnesium, calcium, titanium, zirconium or their binary or ternary mixtures.

It is especially preferred that the oxide gel be a binary or ternary gel of $SiO_2$ and one of the aforementioned metal oxides. The composition of these binary or ternary oxide gels can vary throughout wide ranges. Thus the gel portion can be composed of 75 to 100% by weight of $SiO_2$ and correspondingly 25 to 0% by weight of metal oxide. Particularly good results are achieved with a gel composition which is composed of 90 to 100% by weight $SiO_2$ and 0 to 10% by weight metal oxide.

As binary oxide gels particular mention may be made of the pairs $SiO_2$-$Al_2O_3$, $SiO_2$-$MgO$, $SiO_2$-$ZrO_2$ and $SiO_2$-$TiO_2$. As ternary combinations may particularly be mentioned $SiO_2$-$Al_2O_3$-$MgO$, $SiO_2$-$Al_2O_3$-$ZrO_2$, $SiO_2$-$Al_2O_3$-$CaO$, $SiO_2$-$Al_2O_3$-$TiO_2$, $SiO_2$-$MgO$-$ZrO_2$ and $SiO_2$-$MgO$-$TiO_2$.

The introduction of zeolite into a gel matrix is itself known. It is advantageously accomplished by precipitation of zeolite, in accordance with the invention zeolite Y, in an oxide gel through the sol-gel process. Such a manner of operation is described, for example, in general fashion in the previously mentioned German examined application DE-AS No. 1 299 603, particularly in column 2, line 29 through column 3, line 14; column 4, line 27 through column 7, line 3, and Examples 2 through 9, and can easily be adapted in accordance with the foregoing more closely specified limiting conditions of the invention to the production of catalyst compositions which can be utilized in the process of the invention.

The additional precipitation of finely divided material considered necessary in DE-AS No. 1 299 603, which has be mentioned as an example, is not absolutely necessary in accordance with the present invention. To improve the physical characteristics of the catalyst such as, for example, hardness, abrasion resistance, etc., however, pulverulent, inert, finely divided material such as alpha-$Al_2O_3$ can also be added in a known manner to the composition of exchanged zeolite Y and oxide gel. The amount of this inert, finely divided material is to be measured such that its proportion of the totality of finely divided, exchanged zeolite and inert, finely divided material does not exceed 50% by weight, preferably not more than 20% by weight.

An especially preferred variant of the invention envisions the use of catalysts which in addition to the previously mentioned components contain a phase which exhibits hydrogen binding capability. With regard to this measure there is a substantial difference compared to the catalysts known from DE-AS No. 1 299 603 which are not permitted to contain precisely such components.

As the phase with hydrogen binding capability, one or more of the metals from the transition metal group, particularly from the group of metals having atomic numbers 22 to 28, 40 to 46, 57 to 71 and/or 72 to 78, preferably 26 to 28 and/or 57 to 71, or compounds of these metals may be utilized. Preferably the metals iron, cobalt, nickel and/or rare earth metals or mixtures of the aforesaid metals as well as their compounds may be utilized.

As the phase with hydrogen binding capability, on the one hand, compounds of the aforesaid metals are utilized, individually or in admixture. Such compounds can be introduced, for example, as soluble salts or as solid powders during the production of the catalysts. Preferably, chalcogenides such as, for example, sulfides, are utilized as compounds. In particular, oxygen compounds are utilized as chalcogenides such as, for example, oxides (iron oxide, etc.) or mixed oxides such as, for example, titanates of transition metals, for example iron titanate.

In one particular variant the phase with hydrogen binding capability is a metallic phase, i.e., a metal or a mixture of metals. The term "mixture" thereby includes both mixtures of metal powders or their precursors and also alloys of metals.

The proportion of the phase with hydrogen binding capability in the total catalyst can be varied throughout wide ranges. Thus, its concentration may lie in the range from 0.05 to 15% by weight; very good results have been achieved in the range from 0.1 to 5% by weight.

The phase with hydrogen binding capability can be introduced into the catalyst in various ways. On the one hand, it is possible to incorporate a corresponding metal powder in the material to be used for forming the gel. On the other hand, it is possible to deposit a metallic phase on the solid catalyst, such as, for example, by coating, vapor deposition, etc.

A further variant is to introduce the phase with hydrogen binding capability in the form of metal compound—whether by working it into the gel material or by subsequent treatment of the solid catalyst—and insofar as it is desired to obtain the metallic phase, to form it by reduction of the metal compound, for example, by heating in an inert gas stream or by treatment with a liquid reducing agent or with a gaseous reducing agent such as hydrogen, ammonia, etc.

The process according to the invention removes nitrogen oxides ($NO_x$) reductively with the addition of a hydrogen donor. A lower hydrocarbon (e.g. containing 1 to 6 carbon atoms, preferably 1 to 4 carbon atoms), such as methane, or a mixture of hydrocarbons, such as natural gas, or hydrogen can, for example, be utilized as such a hydrogen donor. This addition preferably comes into play if the exhaust gas contains little or no amount of oxygen. As a further hydrogen donor, ammonia is particularly suitable, even for exhaust gases such as combustion gases which include significant proportions of oxygen.

The hydrogen donor is is utilized in known concentrations, which amount to 20 to 120 mole-%, preferably 50 to 100 mole-% of the stoichiometrically required amount calculated with reference to the $NO_x$ contained in the exhaust gas.

The $NO_x$ reduction can take place in accordance with the invention at low temperatures. Thus, good results in removing nitrogen oxides are achieved at temperatures above about 150° C. (exhaust gas temperature). In principle there is no set upper limit; however, in a normal case it is sufficient to operate at temperatures up to 350° C., particularly up to 280° C.

In accordance with one object of the invention, a new catalyst is also provided. This catalyst is distinguished by the following composition:

(a) 10 to 95% by weight lithium and/or rare earth metal ion exchanged zeolite Y;
(b) 4.95 to 89.95% by weight amorphous oxide gel matrix selected from the group $SiO_2$ and/or oxides of the metals aluminum, magnesium, calcium, titanium, zirconium, or their binary or ternary mixtures, and
(c) 0.05 to 15% by weight of a phase with hydrogen binding capability selected from the group of transition metals, particularly from the group of metals with atomic numbers 22 to 28, 40 to 46, 57 to 71 and/or 72 to 78, preferably 26 to 28 and/or 57 to 71 or compounds of these metals, whereby the sum of the components (a) through (c) in each case amounts to 100% by weight.

The catalyst to be used for the process according to the invention can be utilized in all known forms, for example, as a coating on an inert support material. It is preferred, however, to use it as a formed body without a support. Known formed bodies include, for example, tablets, spheres, microballs, honeycomb bodies, etc.

The catalyst of the invention and the process according to the invention are distinguished by the following advantageous characteristics:
high achievable degree of nitrogen oxide removal
operation at low temperatures
long service life
insensitivity to catalyst poisons such as sulfur compounds, dust, etc.
insensitivity to abrasion and fouling with inert materials high acid stability.

The invention is useful for treating a broad range of exhaust gases such as, for example, exhaust gases from power plants, such as, for example, block heat power plants, or also for treating exhaust gases from chemical plants. It is particularly advantageously useful for removing nitrogen oxides from combustion gases.

The following examples will serve to explain the invention in further detail without limiting its scope.

EXAMPLES

(A) Production of Catalysts

The catalysts utilized in the following examples were produced according to the following procedure:

(A1) Cation Exchange

Zeolite Y in the sodium form was contacted with a 25% by weight aqueous solution of rare earth metal chloride or lithium chloride at room temperature and subsequently filtered and dried and in appropriate cases calcined. By varying the parameters of contact time, temperature, and pressure, differing amounts of rare earth or lithium ions were incorporated into the zeolite.

The resulting rare earth exchanged zeolite were washed free of soluble salts. The calcined powder was processed in a conventional manner into extruded pellets, molded spheres or honeycomb bodies for use as a catalyst.

(A2) Production of a Catalyst with an Exchanged Zeolite Y in an Oxide Gel Matrix

EXAMPLE A2.1

(I) An aqueous acid solution which contains:
(a) aluminum sulfate and sulfuric acid, or
(b) aluminum sulfate, sulfuric acid and metal sulfate (iron sulfate, manganese sulfate or chromium sulfate), and (II) a waterglass solution (density 1.3 g/ml, 7.3% by weight $Na_2O$) which was reacted with a 25% by weight aqueous suspension of rare earth ion exchanged zeolite Y in a volume ratio of 10:8 were continuously mixed with a mixing sprayer with each other in a weight ratio of 1:10, whereby corresponding relative rates of supply of the solutions or suspensions were employed. The resulting exchanged zeolite Y-containing aluminosilicate sol was formed at room temperature in a gelation time of 2–8 seconds at a pH value of 7.5 into gel bodies in a known manner. The gel bodies which were obtained were aged, washed free of soluble salts and subsequently dried (180° C.) and tempered (320° C.).

EXAMPLE A2.2

A gel body produced according to Example A2.1a was contacted prior to tempering at 320° C. with a 25% by weight aqueous suspension of iron titanate at room temperature for approximately one hour and thereafter dried and tempered.

Following the procedure according to experiment A1 or A2, respectively, the following catalysts were obtained.

| Catalyst | Type | Degree of Exchange |
|---|---|---|
| A1.1 | rare earth zeolite Y | 40 mole-% |
| A1.2 | rare earth zeolite Y | 80 mole-% |
| A1.3 | lithium zeolite Y | 40 mole-% |
| A1.4 | lithium zeolite Y | 80 mole-% |

| Catalyst | Type | Proportion of Gel |
|---|---|---|
| A2.1a | A1.1 + aluminosilicate gel | 60% by weight |
| A2.2a | A1.2 + aluminosilicate gel | 50% by weight |

| Catalyst | Type | Proportion of Metal |
|---|---|---|
| A2.1b | A2.1a + Fe[(1)] | 1.0% by weight |
| A2.1b | A2.1a + Mn[(1)] | 0.8% by weight |
| A2.1b | A2.1a + Cr[(1)] | 0.3% by weight |
| A2.2  | A2.1a + Fe[(2)] | 2.5% by weight |

[(1)] employed as sulfate, calculated as metal
[(2)] employed as titanate, calculated as metal

(B) Removal of $NO_x$

Exhaust gas (combustion gas) which contained 1000 ppm $NO_x$ (calculated as NO) was conducted through a catalyst according to the invention in honeycomb body form at a space velocity of 10,000 $h^{-1}$. Ammonia was added upstream of the catalyst in a stoichiometric amount as a hydrogen donor. The results listed in the following table were obtained.

| Catalyst | Temperature (°C.) | Conversion (mole-%) |
|---|---|---|
| A2.1a | 230 | 67 |
| A2.2  | 242 | 74 |

We claim:
1. A catalyst suitable for selective reduction of nitrogen oxides ($NO_x$) in exhaust gases, said catalyst comprising:
   (a) 10 to 95% by weight zeolite Y which has been subjected to ion exchange with at least one ion selected from the group consisting of lithium ion and rare earth metal ions;
   (b) 4.95 to 89.95% by weight amorphous oxide gel matrix formed of at least one oxide selected from the group consisting of $SiO_2$ and oxides of the metals aluminum, magnesium, calcium, titanium and zirconium or binary or ternary mixtures of such oxides; and
   (c) 0.05 to 15% by weight of a phase having hydrogen binding capability selected from the group consisting of transition metals and compounds of transition metals,
whereby the sum of the components (a) through (c) amounts in each case to 100%.

2. A catalyst as recited in claim 1, wherein said transition metal is selected from the group of transition metals having the atomic numbers 22 to 28, 40 to 46, 57 to 71 and 72 to 78.

3. A catalyst as recited in claim 2, wherein said transition metal is selected from the group of transition metals having the atomic numbers 26 to 28 and 57 to 71.

* * * * *